US007441135B1

(12) United States Patent
Chan et al.

(10) Patent No.: US 7,441,135 B1
(45) Date of Patent: Oct. 21, 2008

(54) ADAPTIVE DYNAMIC BUFFERING SYSTEM FOR POWER MANAGEMENT IN SERVER CLUSTERS

(75) Inventors: Hoi Y. Chan, New Canaan, CT (US); Jeffrey O. Kephart, Cortlandt Manor, NY (US); David W. Levine, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/013,952

(22) Filed: Jan. 14, 2008

(51) Int. Cl.
  *G06F 1/00* (2006.01)
  *G06F 1/26* (2006.01)
  *G06F 1/32* (2006.01)
(52) U.S. Cl. .................. 713/320; 713/300; 713/322; 713/323; 713/324
(58) Field of Classification Search .............. 713/300, 713/320, 323, 324
See application file for complete search history.

(56) References Cited

U.S. PATENT DOCUMENTS

| | | | |
|---|---|---|---|
| 5,283,905 | A | 2/1994 | Saadeh et al. |
| 5,506,987 | A | 4/1996 | Abramson et al. |
| 5,692,204 | A * | 11/1997 | Rawson et al. ............... 713/340 |
| 5,761,507 | A | 6/1998 | Govett |
| 5,872,972 | A | 2/1999 | Boland et al. |
| 6,324,580 | B1 | 11/2001 | Jindal et al. |
| 6,771,661 | B1 | 8/2004 | Chawla et al. |
| 6,795,928 | B2 | 9/2004 | Bradley et al. |

(Continued)

FOREIGN PATENT DOCUMENTS

JP    2006-395986    7/2006

OTHER PUBLICATIONS

Benini, L., "Policy optimization for dynamic power management,"; Computer-Aided Design of Integrated Circuits and Systems, IEEE Transactions, Publication Date: Jun. 1999, vol. 18, Issue: 6, pp. 813-833, INSPEC Accession No. 6270844. Digital Object Identifier: 10.1109/43.766730. Posted online: Aug. 6, 2002 22:29:34.0 http://ieeexplore.ieee.org/xpl/RecentIssue.jsp?punumber=43.

(Continued)

*Primary Examiner*—Mark Connolly
(74) *Attorney, Agent, or Firm*—Scully, Scott, Murphy & Presser. P.C.; Stephen Kaufman, Esq.

(57) ABSTRACT

A system, method and computer program product for managing power consumption in a system comprising at least two computing devices. The at least two computing devices are organized as part of active computing device group or a ready computing device group, the ready computing devices configured into various modes of readiness including a standby mode, a hibernating mode, and a power-off mode. A control device receives obtained sensed parameters indicative of the processing load at the group of active computing devices and determines a "Readiness" index value representing a state of system readiness which is a function of a transition time parameter representing a time for moving one or more computing devices from the second group of ready computing devices to the first group of active devices in response to a service level violation. To achieve maximum power saving and yet meet various performance targets, the ready computing devices are dynamically allocated from amongst three states: standby, hibernating or power-off, based on the current readiness index value.

2 Claims, 4 Drawing Sheets

U.S. PATENT DOCUMENTS

| | | | |
|---|---|---|---|
| 6,816,905 | B1 | 11/2004 | Sheets et al. |
| 6,996,728 | B2 | 2/2006 | Singh |
| 7,051,215 | B2 | 5/2006 | Zimmer et al. |
| 7,058,826 | B2 | 6/2006 | Fung |
| 7,124,321 | B2 | 10/2006 | Garnett et al. |
| 7,174,468 | B2 * | 2/2007 | Gary et al. .................. 713/300 |
| 7,210,145 | B2 | 4/2007 | Srinivasan |
| 7,219,249 | B1 * | 5/2007 | Ghose et al. ................ 713/324 |
| 7,228,441 | B2 | 6/2007 | Fung |
| 7,272,735 | B2 | 9/2007 | Fung |
| 7,337,333 | B2 * | 2/2008 | O'Conner et al. ........... 713/300 |
| 2002/0004915 | A1 | 1/2002 | Fung |
| 2003/0037268 | A1 | 2/2003 | Kistler |
| 2003/0056126 | A1 | 3/2003 | O'Connor et al. |
| 2003/0120751 | A1 | 6/2003 | Husain et al. |
| 2003/0158940 | A1 | 8/2003 | Leigh |
| 2003/0204759 | A1 | 10/2003 | Singh |
| 2004/0015581 | A1 | 1/2004 | Forbes |
| 2004/0034807 | A1 | 2/2004 | Rostowfske |
| 2005/0050200 | A1 | 3/2005 | Mizoguchi |
| 2005/0149940 | A1 | 7/2005 | Calinescu et al. |
| 2005/0165925 | A1 | 7/2005 | Dan et al. |
| 2005/0182838 | A1 | 8/2005 | Sheets et al. |
| 2005/0188075 | A1 | 8/2005 | Dias et al. |
| 2006/0168104 | A1 | 7/2006 | Shimizu et al. |
| 2006/0265616 | A1 | 11/2006 | Cesare et al. |
| 2007/0043860 | A1 | 2/2007 | Pabari |
| 2007/0130341 | A1 | 6/2007 | Ma |
| 2007/0276934 | A1 | 11/2007 | Lai |

OTHER PUBLICATIONS

Chase, J., et al., "Balance of Power: Energy Management for Server Clusters," Proceedings of the 8th Workshop on Hot Topics in Operating (2001). http:// citeseer.ist.psu.edu. http://www.cs.duke.edu/ari/publications/publications.html, Jan. 2001.

Nishimura, F., "Transaction Modes of Electric Energy Exchange and their Effects on Benefit Optimization and Allocation,"Conference: Energy management and power delivery—International conference, EMPD-Proceedings- , 1995; vol. 1 , p. 25-30, Publisher: Piscataway, NJ, IEEE Service Center [distributor], 1995, Inside Conferences. Dialog® File No. 65 Accession No. 1548110. Inside Conferences.

Srivastava, M.B., et al., "Predictive system shutdownS and other architectural techniques for energy efficient programmable computation," Very Large Scale Integration (VLSI) Systems, IEEE Transactions, PublicationDate: Mar. 1996, vol. 4, Issue: 1, pp. 42-55, INSPEC Accession No. 5230289, Digital Object Identifier: 10.1109/92.486080, Posted online: Aug. 6, 2002 20:17:25.0.

Tiwari, Vivek, et al., "Guarded evaluation: pushing power management to logic synthesis/design," International Symposium on Low Power Electronics and Design, Proceedings of the 1995 international symposium on Low power design, pp. 221-226, Publication: 1995. http://doi.acm.org/10.1145/224081.224120.

Zheng, R., et al., "On-demand power management for ad hoc networks,"*in: Ad Hoc Networks*, vol. 3, Issue 1,Jan. 2005, pp. 51-68. DOI: 10.1016/j.adhoc.2003.09.008 http://www.sciencedirect.com/science/journal/15708705 http://www.sciencedirect.com/science?_ob=PublicationURL &_tockey=%23TOC%2312890%232005%23999969.

* cited by examiner

ADAPTIVE DYNAMIC BUFFERING SYSTEM FOR POWER MANAGEMENT IN SERVER CLUSTERS

BACKGROUND

1. Field of the Invention

The invention relates generally to power management techniques for computing systems, generally, and more particularly, the invention relates to effective and efficient and, a dynamic server buffering system for optimizing power consumption in servers while adhering to specified Service Level Agreements (SLAs).

2. Description of the Related Art

The cost of data center server power consumption and the cooling systems to dissipate the generated heat are major expenses in modern data centers where thousands of servers are densely packed in relatively small racks. To maintain effective operation and sustain profitability, it becomes necessary to have power management systems to optimize the power usage with respect to customer requirements. In other words, these power management systems must be able to use minimum power possible and yet be able to satisfy all customer requirements. It is well established that a typical server consumes a relatively high amount of power even it is idle, due to chip leakage current and other supporting components such as disk drive and network gears. Turning system off and direct all traffic to a subset of available servers during non-peak hours is a common approach to save power during periods of low traffic. Current technologies for server shut-down are mainly based on actions of system administrators, by manual operation or/and based on some simple policies. Based on their experiences and workload history, the system operators may shut down systems for an extended period of time. In doing so, these system operators must consider the possibility of sudden increased traffic load and in most cases, usually over-provision to account for the worst case situations in order to maintain customer satisfaction. The amount of effort for the system administrators, and the priority of data center to satisfy customer requirement over the cost of power consumption negate the effective use and benefit of these power management systems.

New power management strategies which turn on and off servers based on real time or near real time workload has been investigated. It is obvious that there is a finite cost of shutting down a system and turning it back on. The amount of time to power down/up and restore active applications means lost time for real work and usually maximum power is used to power on/off a server, not to mention the frequent repeated power on/off cycle increases the wear-and-tear of these servers, resulting in higher failure rate. Due to the time lapsed in restoring a server from shut-down state to fully available for use, usually from 1 to 5 minutes, depending on system applications and configurations, power on a shut-down server may not react fast enough to the sudden increased traffic demand, resulting in frequent violation of customer SLAs. In addition, no customer or data center manager want to see their servers spend most of its productive time in repeat turn on/off. All these potential problems prevent this power management strategies from being widely used.

It would be highly desirable to provide an autonomic, adaptive and dynamic server buffering system for server power on/off to optimize power consumption, and at the same time, guarantees customer satisfaction by satisfying customer SLAs.

SUMMARY

The present invention addresses the needs described above by providing a dynamic buffering system is a buffer tool which includes a set of servers as a workload buffer in various stages of readiness to absorb sudden increased of traffic without frequent power on/off of servers.

In accordance with one embodiment, a server in the buffer may have one of the following stages: 1) full standby mode, which is ready to accept workload instantaneously, but remains idle as long as all main servers can serve the current workload without customer violation; 2) hibernate mode, which allows various components of the servers in this mode to be in minimum consumption power mode, but it may take a short amount of time, in the order of 10 to 30 seconds, to restore to standby mode; 3) fully shut down mode.

The servers in this $3^{rd}$ mode in the buffering tool is completely shut down which allows maximum power saving. The number of servers in the pool, as well as the number of servers in various stages of readiness are determined automatically and dynamically by user policies, or by user-determined pluggable predictive machine learning algorithms as response to real time workload conditions.

The invention particularly addresses a need by providing a system, method and computer program product for managing power consumption in a system comprising at least two computing devices, the method comprising:

providing one or more computing devices in a first group of active computing devices each adapted for processing a computational workload, and, sensing a state of processing operations at the active computing devices, receiving, at a control device, a signal requesting that additional computing devices from a second group of inactive computing devices be added to the first group of active computing devices, or that computing devices from the first group of active computing devices be placed in the second group of inactive computing devices according to the state of processing operations;

determining, by the control device, a system transition time TT value for moving one or more computing devices from the second group of ready computing devices to the first group of active devices, and comparing the TT value against a minimum value, M_min, representing a minimum acceptable delay time for switching a standby computing device from the second group of ready computing devices to the first group of active computing devices and, against a maximum value, M_max, representing a maximum delay interval when all computing devices are in a powered off state;

the control device further dynamically generating a readiness index parameter $RI_t$ at a current time indicating a state of system readiness where $RI_t$ is a real number from 0 to 1, where 0 represents minimum readiness and 1 represents maximum readiness, the $RI_t$ calculated according to one of:

$RI_t = RI_{t-1} + (TT - M\_min)/M\_max$, when increasing system readiness according to a predetermined system response time policy, or, $RI_t = RI_{t-1} - (TT - M\_min)/M\_max$, when decreasing system readiness according to a predetermined system response time policy, and, where $RI_{t-1}$ is a RI value prior to the current time; and, dynamically allocating, by the control device, one or more computing devices in the second group of ready computing devices in various stages of stand-by, hibernating and power-off readiness according to a value of the readiness index parameter, wherein if RI=0, all N ready computing devices in the second group are in powered-off state where N=number of total ready computing devices in the second group; and, if RI=1, all N ready computing devices in the second group are in one of: standby state or hibernating state;

wherein, a time it takes to bringing a computing device from the second group of ready computing device to an active readiness state in the first group is minimized, while maximizing energy savings in the system.

In one dynamic allocation scheme, the method for managing power consumption includes:

providing a number N*(1−RI) of powered off computing devices in the second group;

providing a number N*RI/2 of standby computing devices in the second group; and, providing a number N*RI/2 of hibernating computing devices in the second group.

BRIEF DESCRIPTION OF THE DRAWINGS

The objects, features and advantages of the invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

Figure 1:
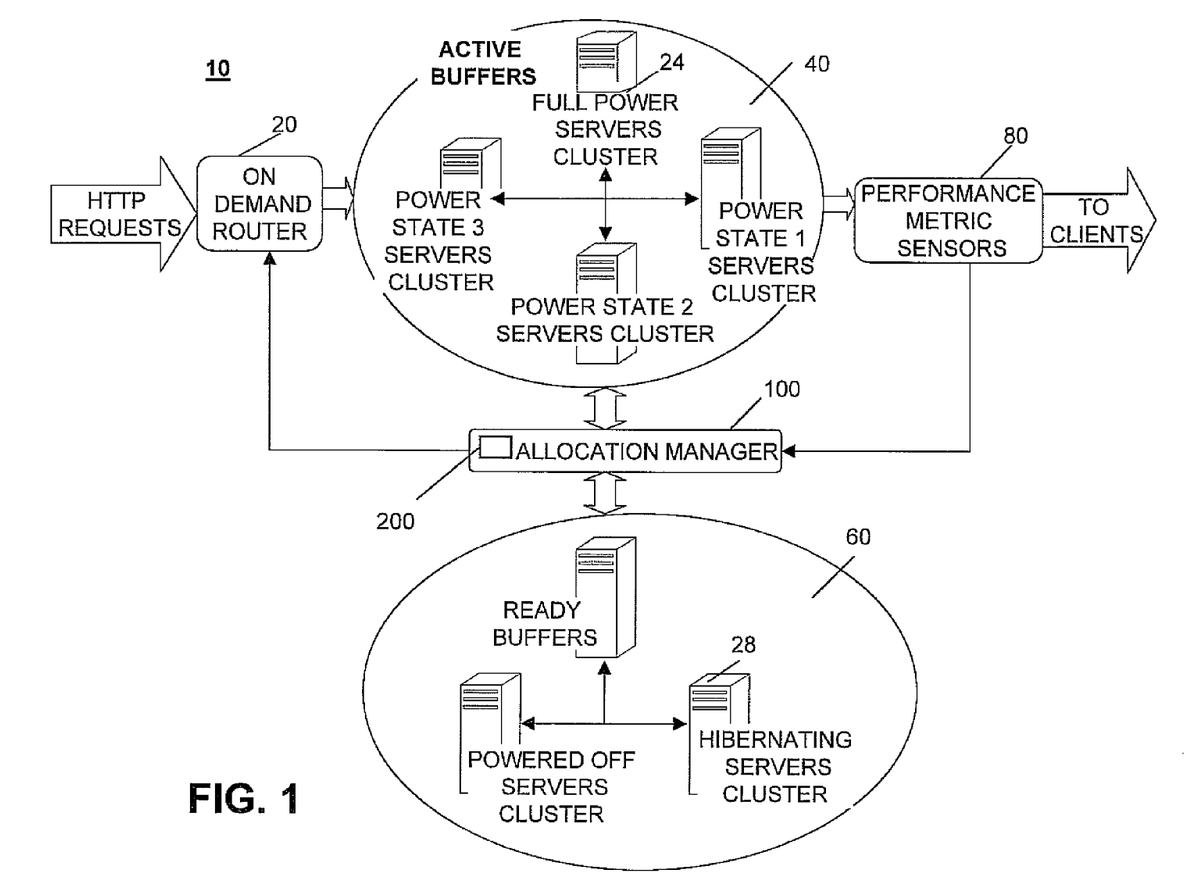
FIG. 1 shows a system diagram depicting the environment in which the present invention is employed.

FIG. 1 illustrates an environment 10 in which the power management system and method of the invention may be employed. As shown in FIG. 1, the system includes: an on-Demand Router 20 that receives http requests from clients (not shown); two (2) server buffers including: an Active buffer 40 and a Ready buffer 60; an Allocation Manager 100; and, performance metric sensors 80. The On-Demand router 20 particularly receives incoming client requests and assigns the requests to one or more of the server devices in the active server buffer (alternately referred to as buffer active buffer pool. The Active Servers Buffer 40 includes computing devices, e.g., servers or server clusters 24 in various power states that are ready to accept workload. The Ready Servers Buffer 60 also includes servers or server clusters 28 in various power saving states such as standby, hibernating and complete powered off states. Allocation Manager 100 is a computing device for controlling the power settings of each of the servers in the Active Servers Buffer, the deployment of servers from the Ready Servers Buffer to the Active Servers Buffer (or removal of servers from the Active Servers Buffer and place them back in the Ready Servers Buffer), and the allocation of servers in each of the readiness states (e.g., Standby, Hibernating and Complete Powered Off) in the Ready Servers Buffer. The Allocation Manager 100 makes its allocation decision based on inputs feedback from the Performance Metric Sensors 80. In operation, Performance Metric Sensors 80 collect system performance data from each of the servers/server clusters from the Active Servers Buffer and forward the sensor data to the Allocation Manager 100 where methods and functions execute for analysis and control purposes. That is, the Allocation Manager 100 may be part of a computing device including a memory having a computer readable instructions, data structures, program modules, and application interfaces forming the analysis and control component. Performance Metric Sensors, which may comprise software agents or applications that run on the system to collect data, collect system performance data including, but not limited to: Response Time, Queue Length (i.e., the number of unprocessed client requests waiting to be serviced), memory usage, down time etc. It should be understood that there may be other sensors that are unique to a specific application. For example, in a web application serving customer requests, the common sensor is a response time sensor. The collected sensor data is forwarded to the Allocation Manager for analysis. At the Allocation Manager, for instance, sensor readings regarding a performance criteria, e.g., request buffer queue length, may be compared with a minimum value and a maximum value, with the Allocation Manager performing steps in accordance with the reading.

Figure 2:
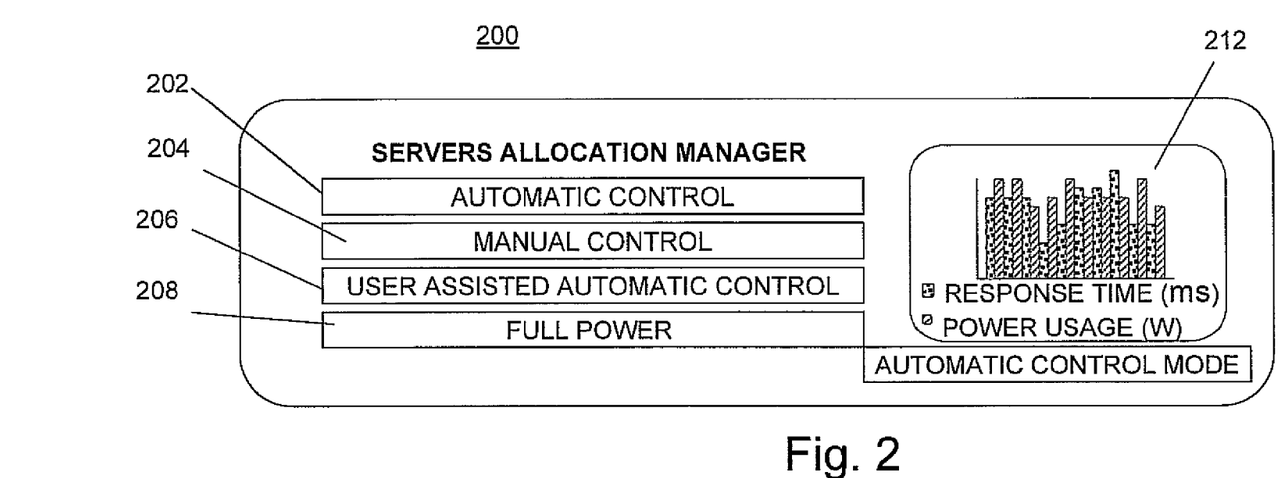
FIG. 2 shows an example server allocation manager GUI 200 according to one embodiment of the invention.

FIG. 2 shows an example graphical user interface (GUI) 200 operable and associated with the Allocation manager computing device 100 that enables users to select various modes of operation. FIG. 2 depicts the GUI 200 having at least four (4) basic user selections representing modes of operation that are available for system control via the Allocation Manager 100. These modes of operation include: 1) Automatic Control 202 enabling execution of computer readable instructions, data structures, program modules, and application interfaces for providing full automatic control of server allocation based on built-in/user defined power management policy; 2) Manual Control 204 enabling execution of computer readable instructions, data structures, program modules, and application interfaces for enabling user selection of the relative allocation of servers among the buffers; 3) User Assisted Automatic Control 206 enabling execution of computer readable instructions, data structures, program modules, and application interfaces for enabling automatic control mode with user confirmation; and, 4) Full Power 208 a mode of operation where all servers are active with full available power.

Additionally shown in FIG. 2 is an interface display portion 212 providing an instantaneous readout of system performance parameter data such as Response Time (e.g., in milliseconds), Queue Length, power usage (e.g., in Watts) as a function of time, and send them to the Allocation Manager for analysis/monitoring of the Active Server Buffers.

Figure 3:
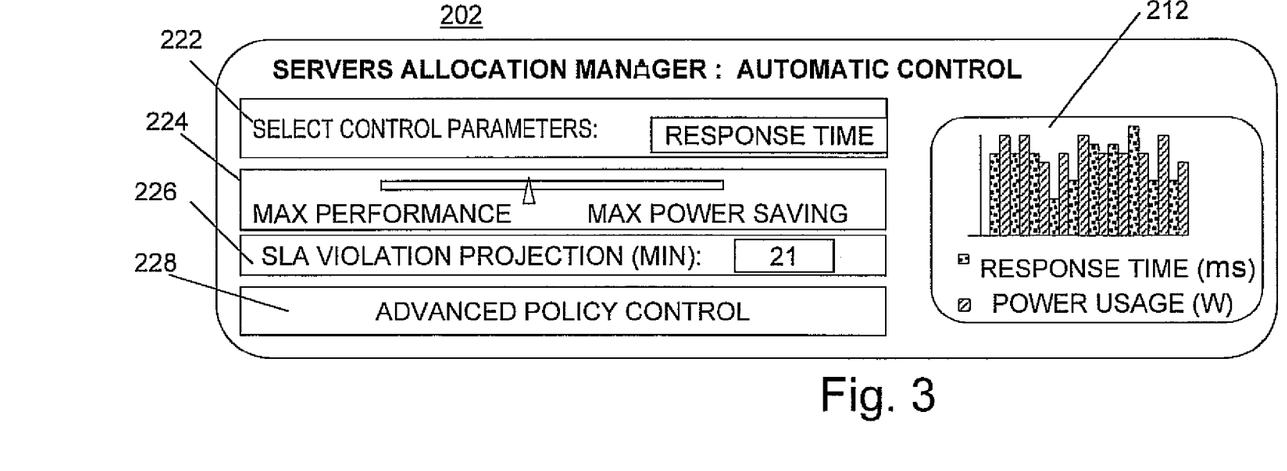
FIG. 3 is an example user interface depicting the Automatic Mode 202 of the Server Allocation Manager.

FIG. 3 depicts the GUI 202 presented via the Allocation manager interface display upon selection of the automatic mode of operation via the Allocation Manager 100. In the fully automatic mode, the system automatically selects the best allocation policy for buffering periodically. However, administrator may override at any time. In this Server Allocation Automatic mode of operation 202, the GUI enables user to select the main parameters to be used by the Allocation Manager to automatically manage the distribution of servers in the active/ready buffers based on the monitored performance. For example: a control button 222 enables user selection of the control parameters such as system response time; a slide bar control 224 enables user control of the amount of power savings with performance as a tradeoff; a window 226 shows the projected Service Level Agreement (SLA) performance target violation (e.g., in units of time) with the selected parameters. Selection of the Advanced policy control 228 allows a user to select user defined or other plugged-in power management policies for execution by the allocation manager.

As referred to herein the SLA pertains to a contract between service providers and clients. The parameters which determine if the SLA is complied depend on the agreement between the service provider and the clients. Usually, the major parameter used is response time the amount of time it takes to receive a response from the service provider after a service request is made (e.g. HTTP call, request a URL etc.). The criteria which determine SLA violation is a parameter agreed upon by the service provider and the client. For example, the response time must not exceed 25% of the agreed value more than 10 times in 5 minutes. This criteria is used in the algorithm as an input parameters.

Figure 4:
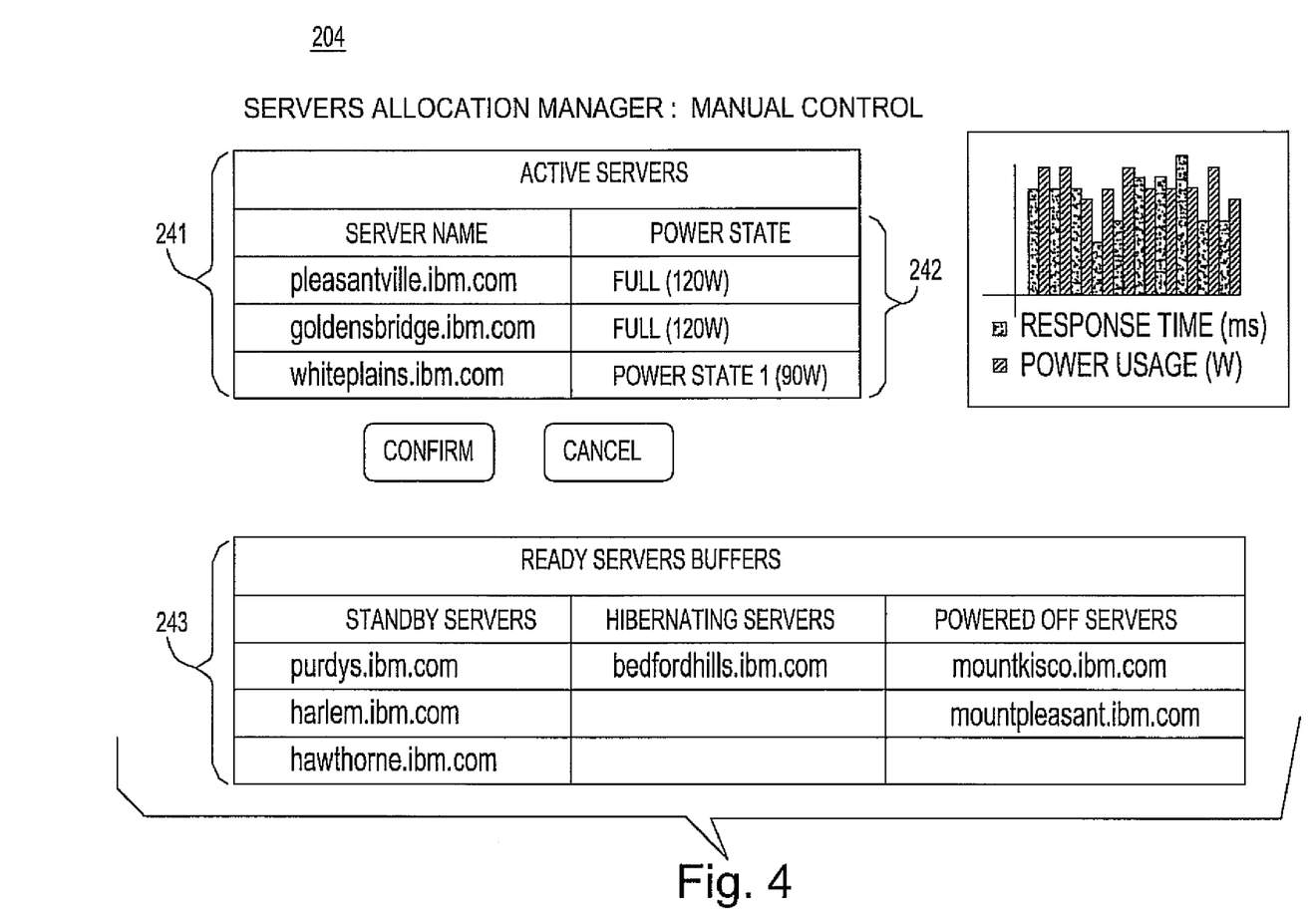
FIG. 4 is an example user interface depicting the Manual Mode 204 of the Server Allocation Manager.

FIG. 4 is an example user interface depicting the Manual Mode 204 of the Server Allocation Manager. FIG. 4 particularly depicts the GUI 204 presented via the Allocation manager interface display upon selection of the manual mode of operation via the Allocation Manager 100. In this Manual mode, users are enabled to assign servers from one buffer to another, for example, by dragging and dropping a selected server (as represented by its server name or ID or icon 244) between a first listing 241 provided for the Active buffer to a second listing 243 provided for the Ready buffers including separate locations from which hibernating, stand-by and powered off servers may be selected from or moved to. In this manner, the users are enabled to adjust the power state of each server via respective power state control selections 242, confirm or cancel the automatic server allocation decision made by the Allocation Manager. As shown in FIG. 4, although not shown, it is understood that in the fully manual mode, the user selects and allocates a pool of n (n=0, 1, 2, . . . , Smax) servers as a server pool. The number of servers in various stage of readiness is completely set by user policies. The policy will remain in effect until the user cancels or selects another buffer policy. In addition, in this manual operation mode, a user can select all servers to be active in accepting workload (no buffer and shutdown), e.g., no server in server pool (n=0). This enables administrators to use full processing power when needed. For example, an administrator may allocate fifteen 15 servers in the server buffer pool in a 30 server environment. Fifteen (15) servers are active servers, 3 server may be in immediate standby mode, 3 may be in hibernate mode and 9 are in fully power mode. As the workload increases, servers in standby mode will be used first to add to the active server list, the standby servers are then replaced by a equivalent number of hibernate servers which in turned are replaced by fall shut down server (power up server). This process continues until all server in power off stage are depleted. In case of decreasing workload, this process reverses. This multiple step stages process provide buffering to enable minimum violation of SLA policy as well as optimizing power consumption.

Figure 5:
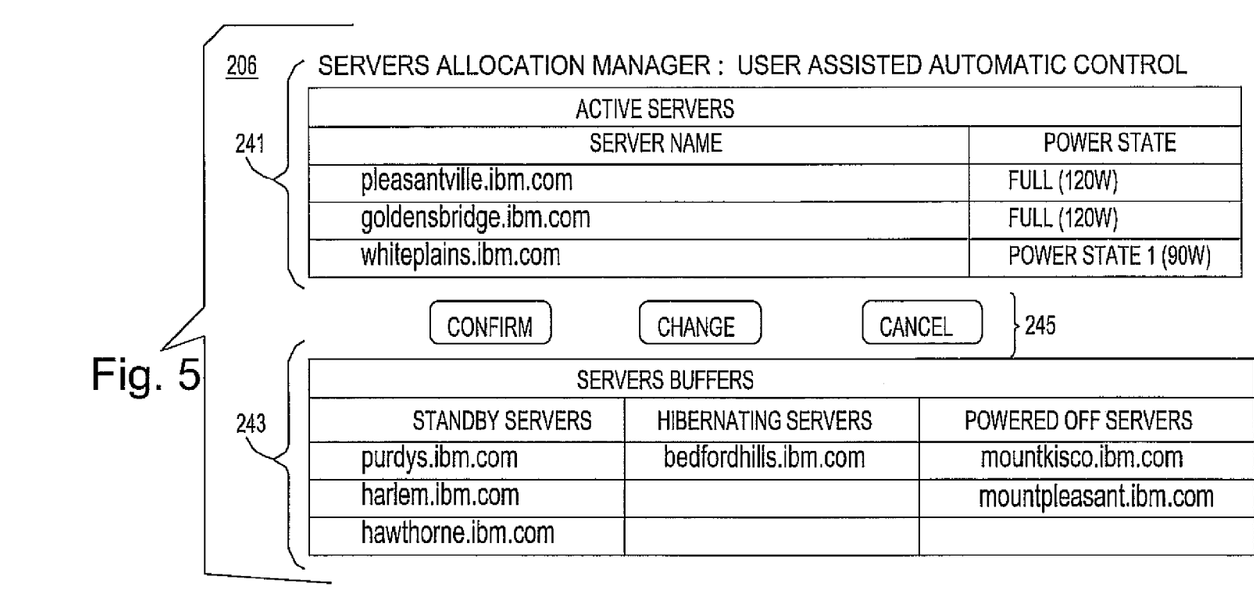
FIG. 5 is an example user interface depicting the User-Assisted Automatic Mode 204 of the Server Allocation Manager; and, FIG. 6 is an example user interface depicting the Full PowerMode 208 of the Server Allocation Manager.

FIG. 5 is an example user interface depicting the User-Assisted Automatic Mode 206 of the Server Allocation Manager. In the User Assisted Automatic Mode, a user is enabled to via user selectable buttons or icons 245 confirm, modify or cancel the server allocation decision made by the Allocation Manager. More particularly, in user assisted automatic mode, a user selects an initial policy to determine the number of servers in each readiness mode, the system will continuously evaluate current workload condition together with historical information to select the best policy to optimize power while meeting customer requirement by selecting an optimized allocation of active, standby, hybernate or power-down servers. It is understood that a user can select any policy as the user sees fit, it is not limited to a pre-defined policy. In one embodiment, the system operates in a fully automated mode (automatic control mode); a user assisted mode is possible which is like the fully automatic control mode but with user verification and confirmation. It is further understood that any change of policy over the initial user selected one must be approved by the administrator. An administrator can override, change or accept the generated policy.

Figure 6:
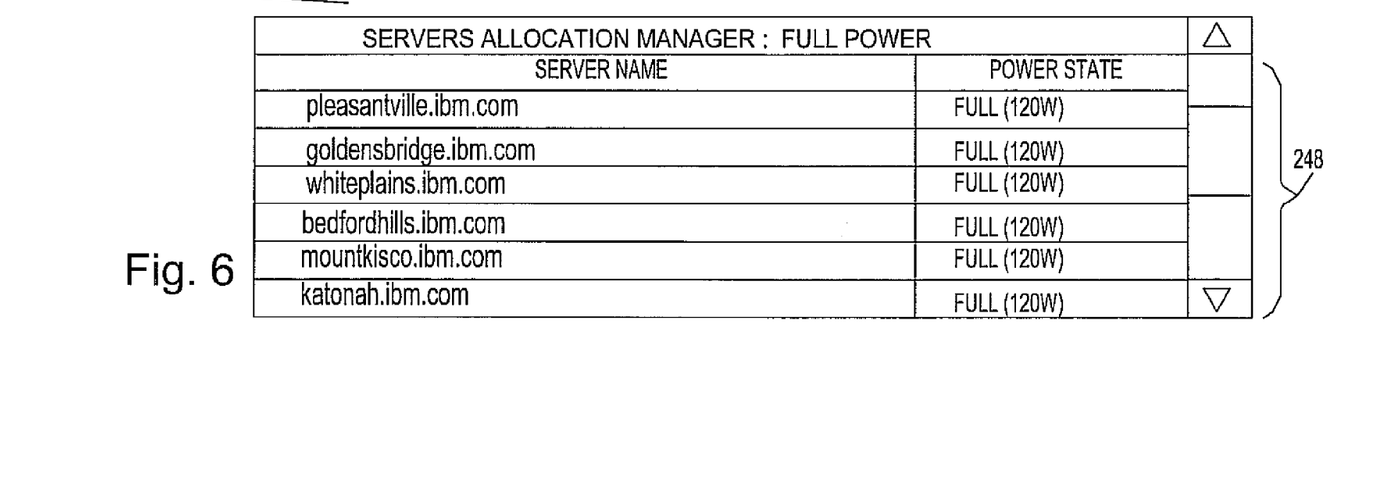

FIG. 6 is an example user interface depicting the Full PowerMode 208 of the Server Allocation Manager. In the Full Power Mode, the power of each server is set to the maximum available power and deploys all servers to the Active Servers Buffer.

In sum, thus, FIGS. 2-4 represent a management system including a graphical user interface (GUI) which enables user to select one of the operating modes: 1) a manual configuration in both active and inactive groups of servers which enables users to set the configuration of the system according his/her current needs; 2) a semi-automatic mode in both active and inactive groups of servers which enables users to examine the said algorithm generated power managed configuration before execution of the configuration; and, 3) full automatic mode which allows the said algorithm generated configuration to be executed without any intervention from the users.

Referring back to FIG. 1, the performance metric sensors as described herein, provide for real-time monitoring of various systems and run time parameters. That is, the mechanism to automatically select the right mix of servers in various stages of readiness in the Ready server buffer pool depends upon the following monitored parameters including, but not limited to: current workload (which may be determined by a workload sensor that measures the intensity of incoming traffic, e.g., workload is arriving at 300 client requests per second); customer SLAs (application priority) which may be fixed parameters, usually defined by a set of parameters (e.g., response time) and are usually stored in memory or a database for reference; current response time (which may be determined by a time sensor that measures the amount of time it takes for the client to receive service response after a request is issued from the most recent request); number of available servers in various stages of readiness, user priority and, environment temperature, etc. (which data is kept in the Allocation Manager and is dynamically updated to reflect the current allocation). Via the user interface provided with the Allocation Manager, a user can assign weight to each of the parameters to emphasize their relative importance. Furthermore, the system dashboard provided in FIG. 2 enables an administrator to project system performance for a specific allocation of servers (as guidance for policy authoring). For example, if maximum power saving is selected (e.g., 40%), the system may recommend 15 servers out of 30 servers to be put in a server pool where 10 servers will be in shutdown state, 2 in standby and 3 in hibernate mode. The administrator however, must accept SLA violation probability of 10 to 20%. In the other extreme, if maximum SLA compliance is selected, a power savings of 10% is achievable given the probability of SLA violation is below 5%.

This power management system further includes a control mechanism which enables user to select one of the following operation modes: a) fully manual; b) user assisted automatic; and c) full automatic mode. An additional full-powered mode is additionally available.

In all operation modes, the power management system continuously records SLA performance/violation data, server performance statistics, server allocation as well as workload condition as data to enable various machine learning or prediction algorithm to continuously enhance its accuracy. For example, one such algorithm implemented is the use of a utility function with positive re-enforcement mechanism to enable maximum accuracy. For example, increased accuracy=positive reward, and decreased accuracy=negative reward. This utility function will eventually converge to an optimal performance with minimum energy consumption.

In the Active Servers Buffer where all the servers are available for work, the power consumption state on each of the servers can be modified from full available power to minimum power by setting the power state of the processors (FIG. 4). This example algorithm may make use of the system response time and SLA as the factors in the analysis, however it is understood that the same basic procedure can be applied to multiple parameters. A pseudocode description of an example method that may be implemented by the allocation manager is as follows:

```
For each server and application running in the Active Servers Buffer
    If SLA target - current response time moving average > delta {
        if server power state != minimum power state
            set power state to the next lower state
        else if number of server running application > 1
            move server to Ready Buffer
    }
    else If SLA target - current response time moving average < 0 {
        if server power state != maximum power state
            set power state to the next higher state
        else
            move a standby server from Ready Servers Buffer to
                Active Servers Buffer
    }
End
```

In the foregoing pseudocode description, "Moving average" is defined as the average of data points in the specified time elapsed. It is called moving average because it keeps changing as time moves forward (for example, 5 minutes moving average of temperature at 3:30 pm is the average of all temperature data taken between 3:25 pm and 3:30 pm). Delta is a parameter determined by the SLA. For example, such parameter can be defined as: the response time must not exceed 25% of the agreed value more than 10 times in 5 minutes.

As mentioned, the response time parameter may be the sole parameter to determine SLA violation and the optimal mix of servers in various power states. However, it is understood that other parameters such as workload, queue length, etc. can be included in the algorithm. Thus, alternatively, a weighted average approach may be used such that:

$$P_1*W_1+P_2*W_2+P_3*W_3 \ldots P_N*W_N$$

where $P_1, P_2, \ldots, P_N$ are parameters used and $W_1, W_2, \ldots, W_N$ are relative weights assigned to each of the parameters with $W_1+W_2 \ldots +W_N=1$.

Then the foregoing pseudocode description (algorithm) may be generalized as:

Aggregate SLA parameters Target - current weighted aggregate parameters moving average > delta It is additionally understood that if only response time is used, then $W_1=1, W_2, W_3 \ldots W_N=0$, the algorithm is defaulted to: SLA target response time - current response time moving average > delta as mentioned hereinabove.

In the Ready Servers Buffer, servers are distributed in each of the different readiness states. For purposes of illustration, there are three readiness states: standby state, hibernating state, and powered off state representing maximum to minimum readiness. For example, it takes typically a few minutes to power up a server from a powered off state, and approximately 10 to 30 seconds from hibernating state to a standby state. Maximum power saving can be achieved if all the servers are in the complete powered off state, but it takes a few minutes to bring a powered off server to the standby state if there is an abrupt increase of workload, the few minutes delay will result in serious violation of performance target. To achieve maximum power saving and yet meet various performance targets, an index is determined referred to as a "Readiness Index" (RI, a real number from 0 to 1, where 0 represents minimum readiness and 1 represents maximum readiness). This index is initially set to a value by the user or, may be at a default of 1. As the system is used, this index will change according to the sensor data feedback mechanism described herein. One non-limiting example that may be implemented by the allocation manager for allocating servers in the Ready Servers Buffer according to the RI is provided in the pseudocode description as follows:

If RI=0, all servers in the Ready Servers Buffer are in powered off state

If RI=1, all servers in the Ready Servers Buffer are in the standby state/hibernating state N=number of total servers in the Ready Servers Buffer N_off=Number of powered off servers=N*(1−RI)

N_standby=Number of standby servers=N*RI/2

N_hibernating=Number of hibernating servers=N*RI/2

The Readiness Index, RI, comprises a real number from 0 to 1, where 0 represents minimum readiness and 1 represents maximum readiness. This index is initially set to a value by the user or at a default of 1. In operation, this RI index will change according to the feedback mechanism. From the Performance Metric, i.e., a single parameter such as the response or transition time which is a measure of the time it takes to recover from response time violation to being in compliance with the SLA, a parameter referred to as "Transition Time Interval" (TT), is defined as the time it takes for the Allocation Manager to remedy a current SLA violation alert by moving servers from the Ready Servers Buffer to the Active Servers. In one example programming aspect that may be implemented by the allocation manager, TT is kept to a minimum.

Thus, letting

M_min=time to move a standby server from Ready Servers Buffer to Active Servers Buffer or minimum acceptable delay; and, M_max=maximum delay interval (with all servers in powered off state)

The following is an example pseudocode depiction of a method employed for automatically configuring ready server buffer readiness index:

```
If TT > M_max
    TT = M_Max

If TT − M_min > 0 { //increase readiness
    RI = RI + (TT − M_min)/M_max
    If RI > 1
        RI = 1;
```

```
}
Else { // decrease readiness
    RI = RI - (TT - M_min)/M_max
    if RI < 0
    RI = 0
}
```

More particularly, M_min and M_max are set as defined above, RI is default to 1 or, an operator can select an initial value between 0 and 1, with 1 being the maximum readiness and 0 for minimum readiness, TT is set as described hereinabove.

The present invention has been described with reference to flow diagrams and/or block diagrams or recitations of methods, apparatus (systems) and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method for managing power consumption in a system comprising at least two computing devices, the method comprising:
   providing one or more computing devices in a first group of active computing devices each adapted for processing a computational workload, and,
   sensing a state of processing operations at said active computing devices,
   receiving, at a control device, a signal requesting that additional computing devices from a second group of inactive computing devices be added to the first group of active computing devices, or that computing devices from the first group of active computing devices be placed in the second group of inactive computing devices according to said state of processing operations;
   determining, by said control device, a system transition time TT value for moving one or more computing devices from the second group of ready computing devices to said first group of active devices, and comparing said TT value against a minimum value, M_min, representing a minimum acceptable delay time for switching a standby computing device from said second group of ready computing devices to said first group of active computing devices and, against a maximum value, M_max, representing a maximum delay interval when all computing devices are in a powered off state;
   the control device further dynamically generating a readiness index parameter $RI_t$ at a current time indicating a state of system readiness where $RI_t$ is a real number from 0 to 1, where 0 represents minimum readiness and 1 represents maximum readiness, said $RI_t$ calculated according to one of:
   $RI_t=RI_{t-1}+(TT-M\_min)/M\_max$, when increasing system readiness according to a predetermined system response time policy, or,
   $RI_t=RI_{t-1}-(TT-M\_min)/M\_max$, when decreasing system readiness according to a predetermined system response time policy, and, where $RI_{t-1}$ is a RI value prior to said current time; and,
   dynamically allocating, by said control device, one or more computing devices in said second group of ready computing devices in various stages of stand-by, hibernating and power-off readiness according to a value of said readiness index parameter, wherein
   if RI=0, all N ready computing devices in the second group are in powered-off state where N=number of total ready computing devices in the second group; and,
   if RI=1, all N ready computing devices in the second group are in one of: standby state or hibernating state;
   wherein, a time it takes to bringing a computing device from said second group of ready computing device to an active readiness state in said first group is minimized, while maximizing energy savings in said system.

2. The method for managing power consumption as claimed in claim 1, wherein said dynamically allocating includes:
   providing a number N*(1−RI) of powered off computing devices in said second group;
   providing a number N*RI/2 of standby computing devices in said second group; and,
   providing a number N*RI/2 of hibernating computing devices in said second group.

* * * * *